United States Patent
Hatano

(10) Patent No.: US 12,465,203 B2
(45) Date of Patent: Nov. 11, 2025

(54) BENDING OPERATION MECHANISM FOR ENDOSCOPE, AND ENDOSCOPE

(71) Applicant: OLYMPUS CORPORATION, Tokyo (JP)

(72) Inventor: Keisuke Hatano, Fuchu (JP)

(73) Assignee: OLYMPUS CORPORATION, Tokyo (JP)

(*) Notice: Subject to any disclaimer, the term of this patent is extended or adjusted under 35 U.S.C. 154(b) by 672 days.

(21) Appl. No.: 17/717,418

(22) Filed: Apr. 11, 2022

(65) Prior Publication Data
US 2022/0233057 A1 Jul. 28, 2022

Related U.S. Application Data

(63) Continuation of application No. PCT/JP2019/040323, filed on Oct. 11, 2019.

(51) Int. Cl.
*A61B 1/005* (2006.01)

(52) U.S. Cl.
CPC .......... *A61B 1/0057* (2013.01); *A61B 1/0052* (2013.01)

(58) Field of Classification Search
CPC .............. A61B 1/0052; A61B 1/0057; A61M 25/0136; A61M 25/0147; A61M 2025/015
See application file for complete search history.

(56) References Cited

U.S. PATENT DOCUMENTS

| | | | |
|---|---|---|---|
| 4,499,895 A * | 2/1985 | Takayama | A61B 1/0052 388/930 |
| 5,626,553 A * | 5/1997 | Frassica | A61M 25/0136 600/146 |
| 6,236,876 B1 * | 5/2001 | Gruner | A61B 1/0016 600/407 |
| 2003/0092965 A1 * | 5/2003 | Konomura | A61B 1/0016 600/152 |
| 2008/0275302 A1 | 11/2008 | Hosaka | |
| 2012/0302949 A1 | 11/2012 | Takemoto | |
| 2013/0331652 A1 * | 12/2013 | Okamoto | A61B 1/00042 600/146 |
| 2014/0251042 A1 * | 9/2014 | Asselin | F16H 21/40 74/89 |
| 2016/0073856 A1 * | 3/2016 | Saito | A61B 1/0057 600/149 |
| 2016/0227986 A1 | 8/2016 | Yasunaga et al. | |
| 2016/0338571 A1 * | 11/2016 | Hareaguchi | A61B 1/00087 |

(Continued)

FOREIGN PATENT DOCUMENTS

| | | |
|---|---|---|
| EP | 3192426 A1 | 7/2017 |
| EP | 3219247 A1 | 9/2017 |

(Continued)

OTHER PUBLICATIONS

International Search Report dated Dec. 17, 2019 issued in PCT/JP2019/040323.

*Primary Examiner* — Michael J Carey
*Assistant Examiner* — Stephen Floyd London
(74) *Attorney, Agent, or Firm* — Scully, Scott, Murphy & Presser, P.C.

(57) ABSTRACT

A bending operation mechanism includes an operation lever, a wire pulling member, a pulling wire, a cylinder, and a pulley, and the pulley is disposed with a predetermined rotation shaft tilted so that an extended line of the predetermined rotation shaft intersects with the cylinder.

20 Claims, 12 Drawing Sheets

(56) References Cited

U.S. PATENT DOCUMENTS

| | | | |
|---|---|---|---|
| 2017/0215697 A1 | 8/2017 | Hatano et al. | |
| 2017/0280973 A1 | 10/2017 | Hatano | |
| 2018/0080533 A1* | 3/2018 | Awtar | A61B 34/71 |
| 2019/0029498 A1* | 1/2019 | Mankowski | A61B 1/0057 |

FOREIGN PATENT DOCUMENTS

| | | |
|---|---|---|
| JP | H07136104 A | 5/1995 |
| JP | 2004321492 A | 11/2004 |
| JP | 2009005836 A | 1/2009 |
| WO | 2011089777 A1 | 7/2011 |
| WO | 2013108776 A1 | 7/2013 |
| WO | 2016147457 A1 | 9/2016 |
| WO | 2016199485 A1 | 12/2016 |
| WO | 2017090533 A1 | 6/2017 |

\* cited by examiner

BENDING OPERATION MECHANISM FOR ENDOSCOPE, AND ENDOSCOPE

CROSS REFERENCE TO RELATED APPLICATION

This application is a continuation application of PCT/JP2019/040323 filed on Oct. 11, 2019, the entire contents of which are incorporated herein by this reference.

BACKGROUND OF THE INVENTION

1. Field of the Invention

The present invention relates to a bending operation mechanism for an endoscope, the bending operation mechanism including an operation lever that is tiltable in a predetermined direction, and the endoscope.

2. Description of the Related Art

Recently, an endoscope has been widely used in medical and industrial fields. With the endoscope, it is possible to observe a site to be examined in a subject by inserting an elongated insertion portion into the subject.

In a well-known configuration, a bending portion that is actively and selectively bendable in any of up, down, right, and left directions or in a combined direction of two directions of the up, down, right, and left directions is provided at a distal end side of the insertion portion of the endoscope.

When bent, the bending portion can improve progressiveness of the insertion portion through an inflected portion in the subject and can also change an observation direction of an observation optical system provided at a distal end portion positioned on a distal end side in a longitudinal axial direction of the insertion portion relative to the bending portion.

For example, one pair of, that is, two pulling wires or two pairs of, that is, four pulling wires, distal ends of which in the longitudinal axial direction are fixed to the bending portion are inserted in an operation portion of the endoscope, the operation portion being provided continuously in the insertion portion of the endoscope and at a proximal end of the insertion portion in the longitudinal axial direction. Note that three of the pulling wires may be inserted in the operation portion.

Any of the two or four pulling wires, or two of the four pulling wires are pulled by a bending operation device provided at the operation portion of the endoscope.

With this configuration, the bending portion is actively and selectively bendable in any of the up and down directions, any of the right and left directions, any of the four directions of the up, down, right, and left directions, or a combined direction of two directions of the up, down, right, and left directions.

Note that a configuration of the bending operation device configured to pull pulling wires is well known. For example, International Publication No. 2016/199485 discloses a configuration of an endoscope in which a known joystick device is used for the bending operation device.

The joystick device actively and selectively bends the bending portion by pulling wires through a bending operation mechanism along with a tilt operation of a lever.

Specifically, in the endoscope disclosed in International Publication No. 2016/199485, an operation lever of the joystick device is selectively tiltable in the up direction or the down direction. With this configuration, the bending portion is selectively bendable in the up and down directions.

The operation lever is also selectively tiltable in the left direction or the right direction. With this configuration, the bending portion is selectively bendable in the right and left directions.

The operation lever is also selectively tiltable in a combined direction of the up direction and the right direction, a combined direction of the up direction and the left direction, a combined direction of the down direction and the right direction, and a combined direction of the down direction and the left direction.

With this configuration, the bending portion is selectively bendable in a combined direction of two of the up, down, right, and left directions.

More specifically, the operation lever is connected to and rising up from a center of a wire pulling member having, for example, an X plane shape with four arms, and each arm of the wire pulling member is tiltable along with tilt of the operation lever.

Each of the arms is connected to one end of a corresponding one of four pulling wires extending in the longitudinal axial direction, the other end of which is fixed to the bending portion, and each of the pulling wires moves with tilt of the corresponding arm.

In the operation portion of the endoscope, pulleys corresponding to the respective arms are disposed in a space on a side opposite to a side on which the operation lever is connected to the arms in an extension direction of the operation lever when not operated, the pulleys having outer peripheral portions around which the pulling wires are wound and being capable of changing moving directions of the pulling wires from the extension direction of the operation lever to the longitudinal axial direction of the insertion portion.

With this configuration, when the operation lever is tilted in a predetermined direction, each arm of the wire pulling member is tilted, and one or two pulling wires corresponding to the tilt direction of the operation lever among the four pulling wires connected to the respective arms are pulled. As a result, the bending portion bends in a direction corresponding to the tilt direction of the operation lever.

International Publication No. 2016/199485 also discloses a configuration for size reduction of the operation portion of the endoscope, in which a connection portion for a suction button is disposed in a region between two adjacent pulleys among the four pulleys to avoid the pulling wires.

Note that the suction button is disposed at a position that overlaps a central axis of the operation portion of the endoscope and at which the operation portion can be held in a hand of an operator grasping the operation portion so that a button operation can be easily performed by the operator grasping the operation portion with a right hand or a left hand.

SUMMARY OF THE INVENTION

A bending operation mechanism for an endoscope according to an aspect of the present invention includes: an operation lever that is tiltable in a predetermined direction; a wire pulling member connected to the operation lever and including at least two arms that are tiltable along with tilt of the operation lever; pulling wires connected to the at least two arms, respectively, and configured to move with tilt of the wire pulling member; a button connection member for a push button, the button connection member being disposed in a region between each two adjacent arms among the at least two arms in an adjacent direction of the two adjacent arms; and at least two pulleys including outer peripheral portions around which the pulling wires extended from the at least two arms are wound, respectively, the at least two pulleys being rotatable about predetermined rotation axes along with movement of the pulling wires, and each of the two pulleys with the button connection member being disposed in the region is disposed with a respective outer peripheral portion of the outer peripheral portions being tilted so that, in the adjacent direction, a first distance between one end part of the respective outer peripheral portion on a side closer to the two adjacent arms and an axis center of the button connection member is shorter than a second distance between another end part of the respective outer peripheral portion on a side farther from the two adjacent arms and the axis center.

An endoscope according to an aspect of the present invention is an endoscope including a bending operation mechanism, the bending operation mechanism including: an operation lever that is tiltable in a predetermined direction; a wire pulling member connected to the operation lever and including at least two arms that are tiltable along with tilt of the operation lever; pulling wires connected to the at least two arms, respectively, and configured to move with tilt of the wire pulling member; a button connection member for a push button, the button connection member being disposed in a region between each two adjacent arms among the at least two arms in an adjacent direction of the two adjacent arms; and at least two pulleys including outer peripheral portions around which the pulling wires extended from the at least two arms are wound, respectively, the at least two pulleys being rotatable about predetermined rotation axes along with movement of the pulling wires, and each of the two pulleys with the button connection member being disposed in the region is disposed with a respective outer peripheral portion of the outer peripheral portions being tilted so that, in the adjacent direction, a first distance between one end part of the respective outer peripheral portion on a side closer to the two adjacent arms and an axis center of the button connection member is shorter than a second distance between another end part of the respective outer peripheral portion on a side farther from the two adjacent arms and the axis center.

DETAILED DESCRIPTION OF THE PREFERRED EMBODIMENT

An embodiment of the present invention will be described below with reference to the accompanying drawings.

Figure 1:
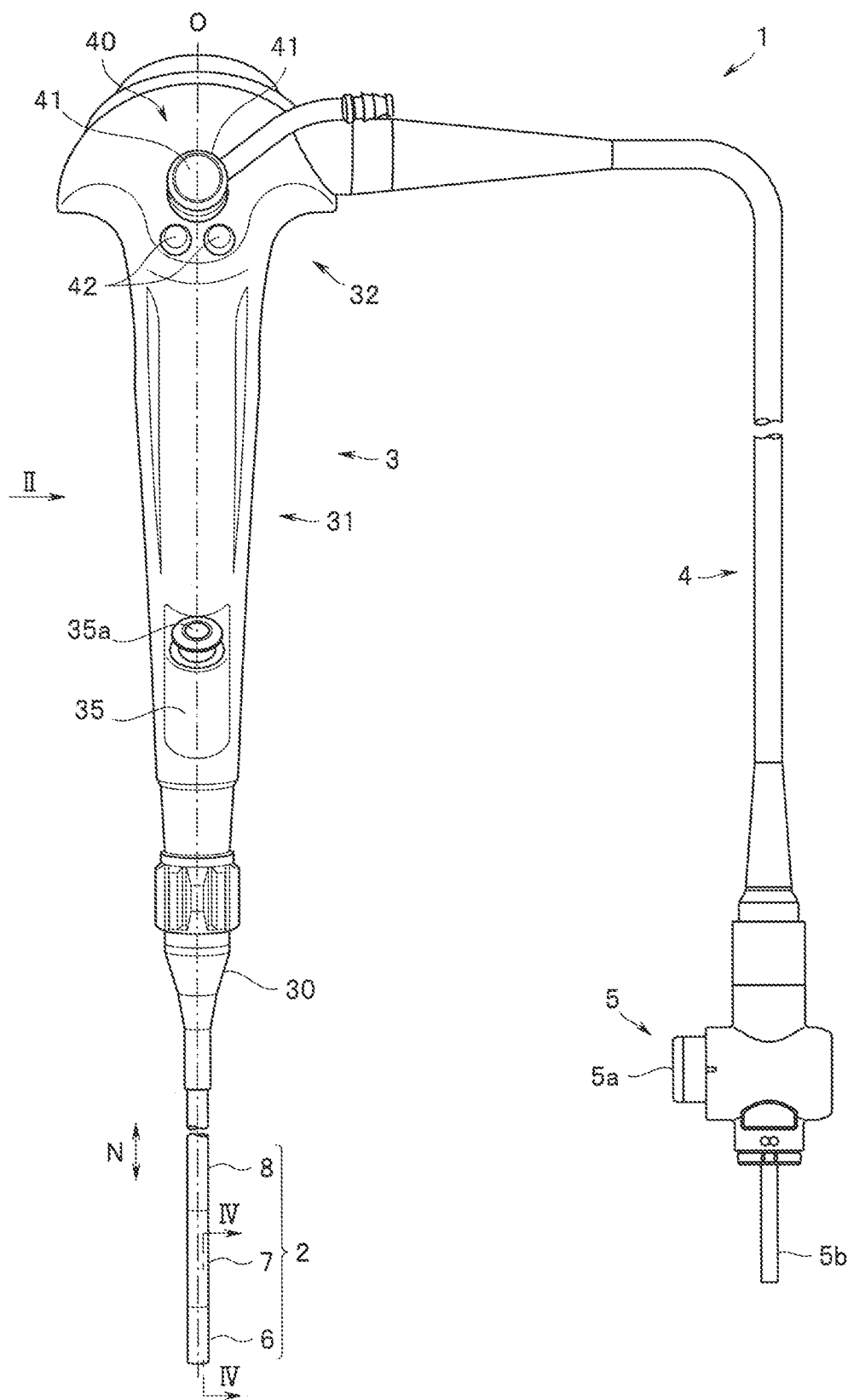
FIG. 1 is a front view illustrating appearance of an endoscope provided with a bending operation mechanism according to the present embodiment.
Figure 2:
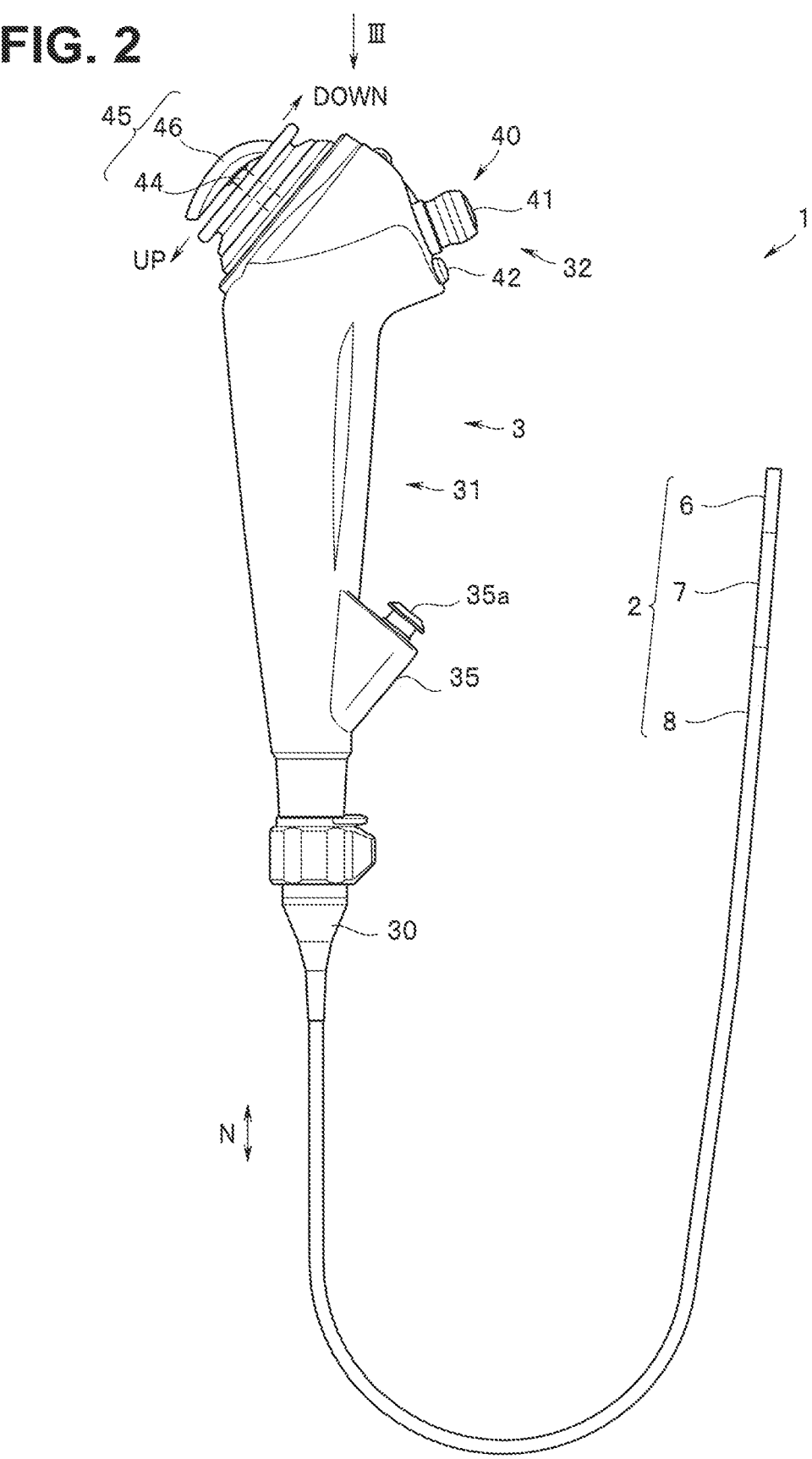
FIG. 2 is a side view of the endoscope in FIG. 1 when viewed in II direction in FIG. 1.
Figure 3:
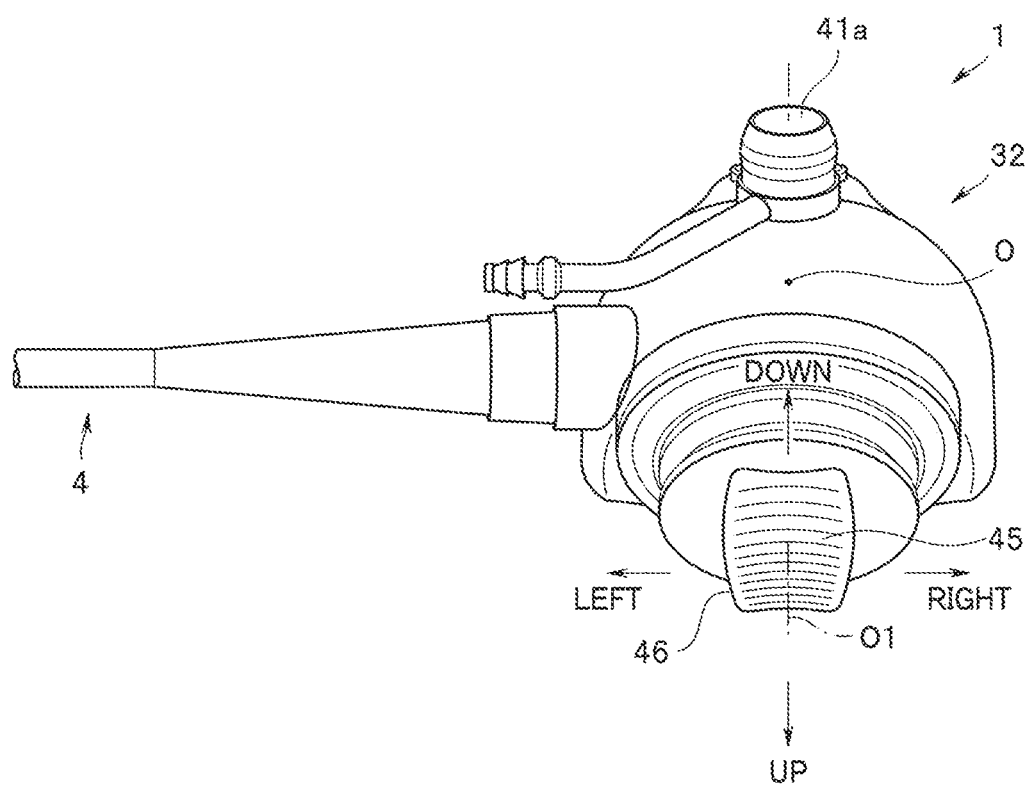
FIG. 3 is a partial top view of the endoscope in FIG. 2 when viewed in III direction in FIG. 2.

FIG. 1 is a front view illustrating appearance of an endoscope provided with a bending operation mechanism according to the present embodiment, FIG. 2 is a side view of the endoscope in FIG. 1 when viewed in II direction in FIG. 1, and FIG. 3 is a partial top view of the endoscope in FIG. 2 when viewed in III direction in FIG. 2.

Figure 4:
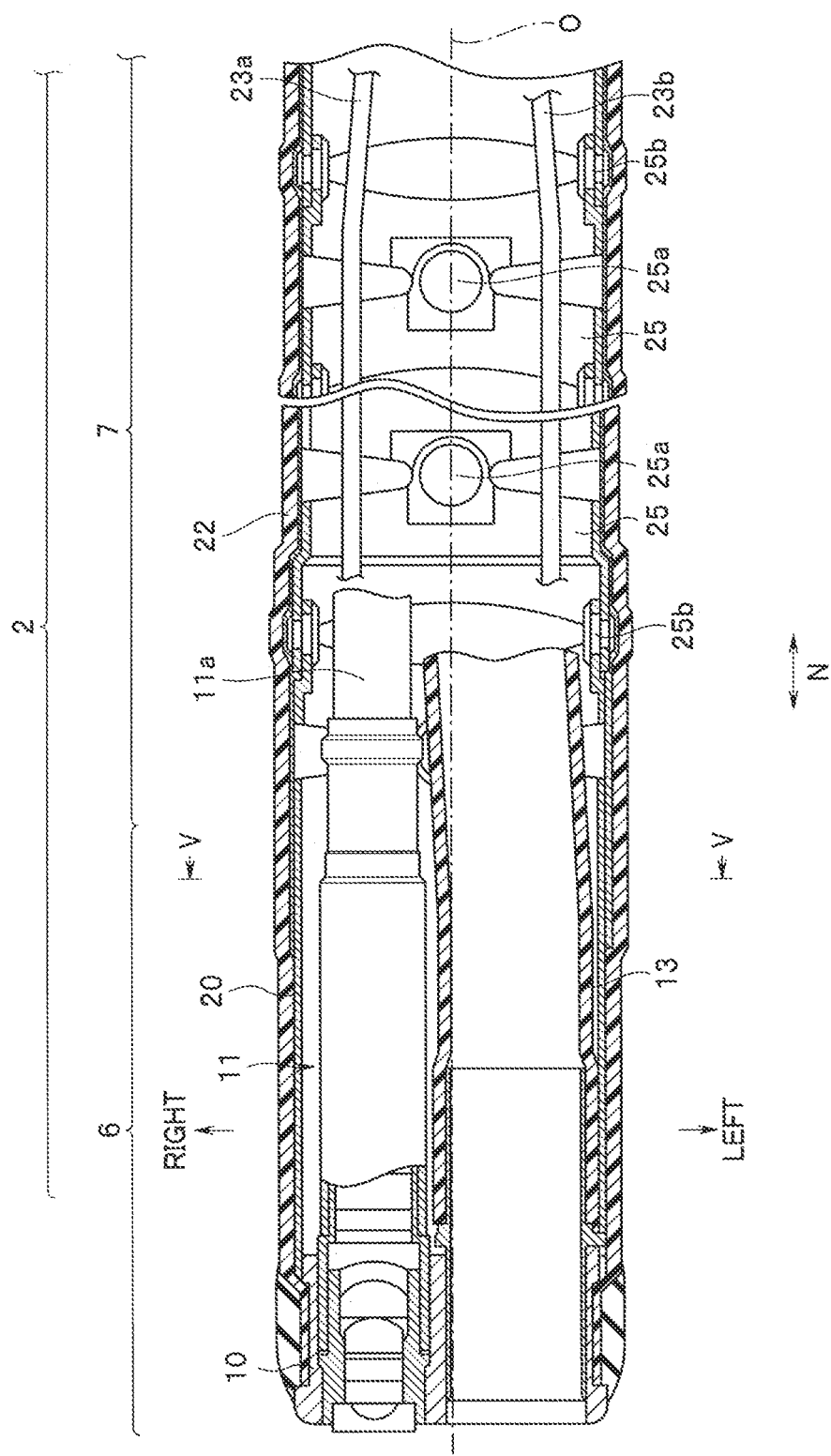
FIG. 4 is a cross-sectional view of a distal end portion and a bending portion of an insertion portion of the endoscope in FIG. 1, which is taken along line IV-IV in FIG. 1.
Figure 5:
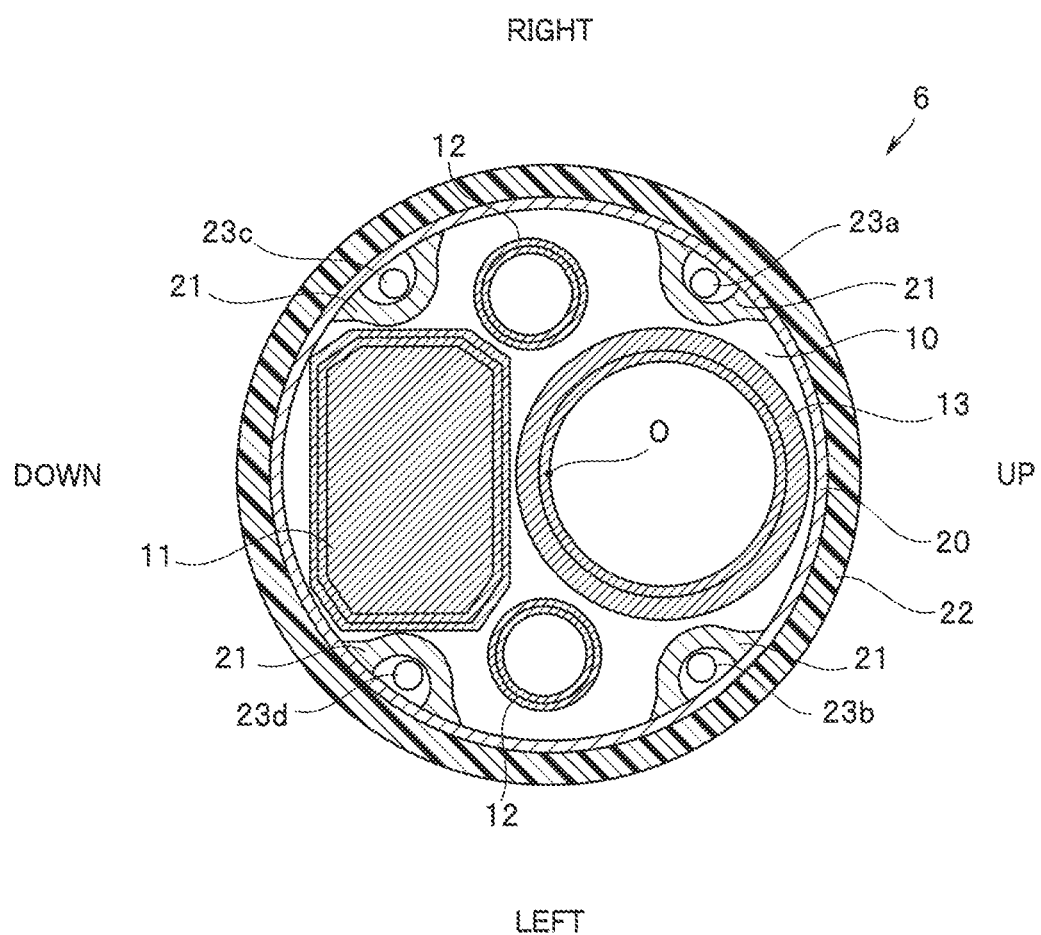
FIG. 5 is a cross-sectional view of the distal end portion along line V-V in FIG. 4.
Figure 6:
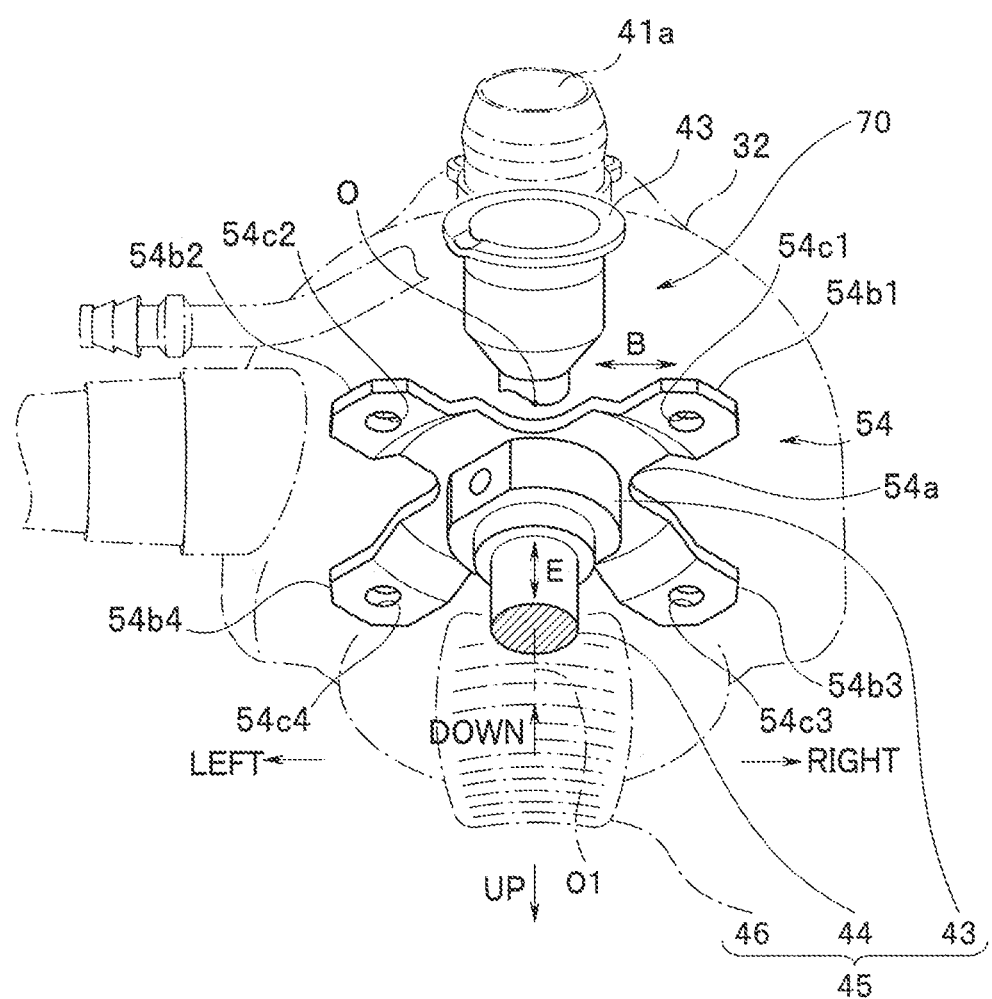
FIG. 6 is a perspective view schematically illustrating the bending operation mechanism provided in an operation portion in FIG. 1.

FIG. 4 is a cross-sectional view of a distal end portion and a bending portion of an insertion portion of the endoscope in FIG. 1, which is taken along line IV-IV in FIG. 1, FIG. 5 is a cross-sectional view of the distal end portion along line V-V in FIG. 4, and FIG. 6 is a perspective view schematically illustrating a bending operation mechanism provided in an operation portion in FIG. 1.

Figure 7:
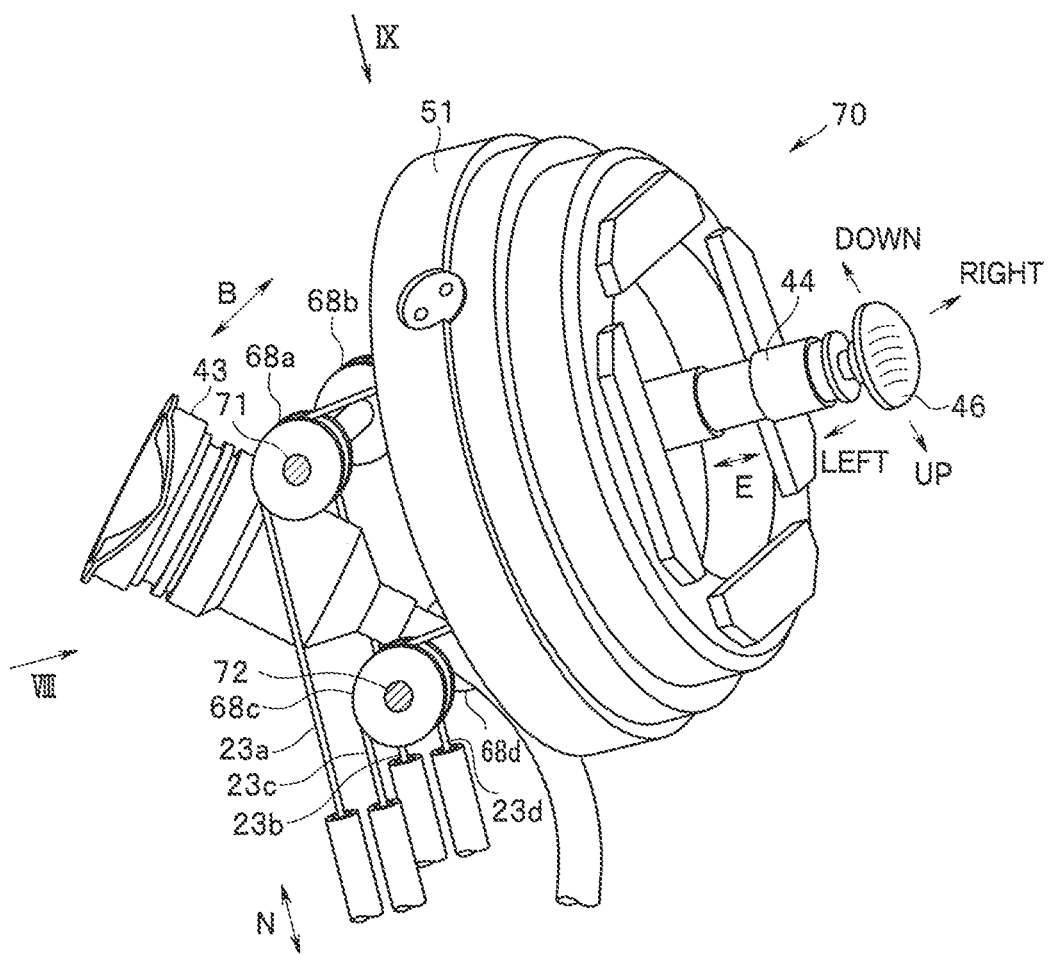
FIG. 7 is an enlarged perspective view illustrating the bending operation mechanism in FIG. 6.
Figure 8:
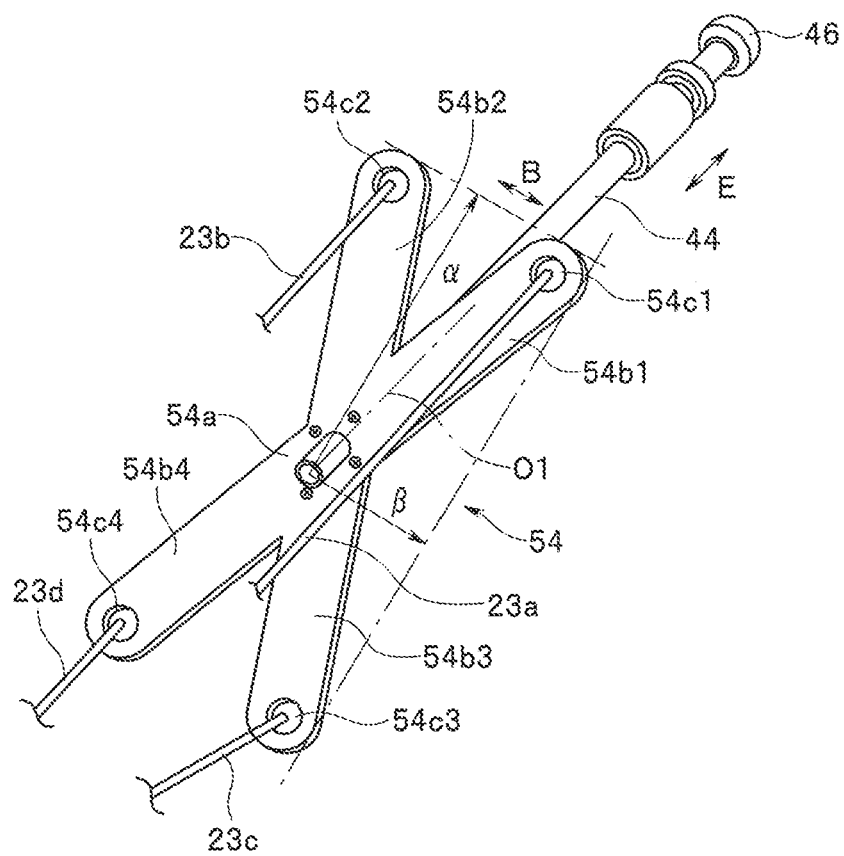
FIG. 8 is a perspective view of a wire pulling member connected to an operation lever and pulling wires in the bending operation mechanism in FIG. 7 when viewed in VIII direction in FIG. 7.

FIG. 7 is an enlarged perspective view illustrating the bending operation mechanism in FIG. 6, and FIG. 8 is a perspective view of a wire pulling member connected to an operation lever and pulling wires in the bending operation mechanism in FIG. 7 when viewed in VIII direction in FIG. 7.

As illustrated in FIGS. 1 and 2, an endoscope 1 is, for example, an endoscope for bronchi. The endoscope 1 has a main part including an insertion portion 2 formed in an elongated shape, an operation portion 3 provided continuously with a proximal end of the insertion portion 2 in a longitudinal axial direction N, an universal code 4 extended from the operation portion 3, and an endoscope connector 5 provided at an extension end of the universal code 4.

The insertion portion 2 has a main part including, sequentially from a distal end side in the longitudinal axial direction N, a distal end portion 6, a bending portion 7, and a flexible tube portion 8 and is formed as a tubal member having flexibility.

The operation portion 3 has a main part including a folding prevention portion 30 connected to the flexible tube portion 8 and covering a proximal end of the flexible tube portion 8 in the longitudinal axial direction N, a grasping portion 31 that is provided continuously with the folding prevention portion 30 and can be grasped by a hand of an operator, and an operation portion body 32 continuously provided on the proximal end side of the grasping portion 31 in the longitudinal axial direction N.

Note that, in the present embodiment, for example, a direction about an insertion axis O in the operation portion 3 is defined with reference to a state in which the operator grasps the grasping portion 31. Specifically, front, back, right, and left directions (for example, a front surface, a back surface, and right and left side surfaces) of the operation portion 3 are defined with reference to the operator grasping the grasping portion 31.

As illustrated in FIG. 1, the grasping portion 31 of the operation portion 3 is formed in a shape that is symmetric in the right and left directions with respect to the insertion axis O (central axis), and can be grasped by the operator with any of left and right hands.

A right-left shape of the operation portion body 32 of the operation portion 3 in FIG. 1 is formed as a shape bulged symmetrically in the right and left directions with respect to the insertion axis O.

A treatment instrument insertion portion 35 is provided at a front surface of the grasping portion 31 on the distal end side in the longitudinal axial direction N in FIG. 1. The treatment instrument insertion portion 35 has a treatment instrument insertion opening 35a through which various treatment instruments (not illustrated) are inserted.

The treatment instrument insertion opening 35a communicates with a treatment instrument insertion channel 13 (refer to FIG. 4) inside the operation portion 3. In addition, a forceps plug (not illustrated) as a lid member for blocking the treatment instrument insertion opening 35a is removably attached to the treatment instrument insertion portion 35.

The operation portion body 32 is formed as a hollow member bulged mainly on right, left, and front sides in FIG. 1 and substantially having a partially spherical shape on the proximal end side of the grasping portion 31 in the longitudinal axial direction N. An operation button group 40 for executing various kinds of functions of the endoscope 1 is disposed on the front surface side of the operation portion body 32 in FIG. 1.

The operation button group 40 includes, for example, a suction button 41 removably mounted on the operation portion body 32 and formed as a push button, and two button switches 42 to which any functions can be allocated from among various kinds of functions related to the endoscope 1.

As illustrated in FIG. 1, the suction button 41 is disposed at a center of the operation portion body 32 in a right-left width direction in FIG. 1 so that the suction button 41 overlaps the insertion axis O.

The two button switches 42 are disposed on the distal end side of the suction button 41 in the longitudinal axial direction N at positions that are symmetric in the right and left directions with respect to the insertion axis O.

As illustrated in FIGS. 2 and 3, an operation lever 45 in a bending operation mechanism 70 (refer to FIG. 6) according to the present embodiment for performing a bending operation on the bending portion 7 is disposed on the back surface side of the operation portion body 32 in FIG. 1 so that the operation lever 45 is tiltable in a predetermined direction.

As for the tilt direction of the operation lever 45, as illustrated in FIG. 3, for example, right and left directions of the tilt direction of the operation lever 45 are defined to be the left direction and the right direction as a third direction and a fourth direction of the operation portion 3, respectively, which are orthogonal to the insertion axis O, and up and down directions of the tilt direction of the operation lever 45 are defined to be the up direction and the down direction as a first direction and a second direction of the operation portion 3, respectively, which are orthogonal to the right and left directions.

More specifically, as for the tilt direction of the operation lever 45, for example, the left side in FIG. 3 is defined as a left tilt direction for bending the bending portion 7 to the left side, the right side in FIG. 3 is defined as a right tilt direction for bending the bending portion 7 to the right side, the lower side in FIG. 3 is defined as an up tilt direction for bending the bending portion 7 to the upper side, and the upper side in FIG. 3 is defined as a down tilt direction for bending the bending portion 7 to the lower side.

In other words, in the present embodiment, the operation lever 45 is tiltable in any of the four directions of the up, down, right, and left directions. The operation lever 45 is also tiltable in a combined direction of any two of the four directions of the up, down, right, and left directions.

The operation lever 45 is provided with a finger contact portion 46 with which a thumb of the operator or the like can be made contact.

As illustrated in FIG. 3, the universal code 4 is extended from a left side part of the operation portion body 32. The universal code 4 is a composite cable that reaches the operation portion 3 on the distal end portion 6 side through inside of the insertion portion 2, in which various signal lines and the like extended from the operation portion 3 are inserted, in which light guides 12 of a light source device (not illustrated) are inserted, and in which an air-water feeding tube extended from an air-water feeding device (not illustrated) is inserted.

The endoscope connector 5 includes, at a side surface part, an electric connector portion 5a to which a signal cable electrically connected to a video processor (not illustrated) as an external instrument is connected, and also includes a light source connector portion 5b connected to a light source device as an external instrument.

As illustrated in FIGS. 4 and 5, a distal end rigid portion 10 made of metal is provided in the distal end portion 6 and holds distal end sites of an image pickup unit 11, a pair of the light guides 12, the treatment instrument insertion channel 13, and the like in the longitudinal axial direction N, the image pickup unit 11 being including an image pickup device such as a CCD or a CMOS.

In the distal end portion 6, a leading distal end bending piece 20 having a substantially cylindrical shape is externally fitted on the proximal end side of the distal end rigid portion 10 in the longitudinal axial direction N, and an outer periphery of the leading distal end bending piece 20 is covered by a bending rubber 22.

As illustrated in FIG. 5, wire fixation portions 21 are provided on an inner periphery of the leading distal end bending piece 20 at four places in the direction about the insertion axis O, and distal ends of four pulling wires 23a to 23d in the longitudinal axial direction N are fixed to the wire fixation portions 21, respectively, the pulling wires 23a to 23d being inserted in the insertion portion 2 in the longitudinal axial direction N.

In order to efficiently dispose constituent members without increasing the diameter of the distal end portion 6, as illustrated in FIG. 5, distal end sites of the image pickup unit 11 and the treatment instrument insertion channel 13 as large-sized members in the longitudinal axial direction N are arranged in the right and left directions in the distal end rigid portion 10 and the leading distal end bending piece 20, and the distal end sites of the light guides 12 in the longitudinal axial direction N are disposed in spaces formed in the up and down directions, respectively, due to the arrangement.

In order to avoid interference of the distal end sites of the image pickup unit 11 and the treatment instrument insertion channel 13 in the longitudinal axial direction N with the pulling wires 23a to 23d, the wire fixation portions 21 are provided at positions rotationally shifted in the direction about the insertion axis O by a predetermined angle from positions on the distal end portion 6 in the up, down, right, and left directions.

For example, as illustrated in FIG. 5, the wire fixation portions 21 are provided to the leading distal end bending piece 20 at positions rotationally shifted to right and left in the direction about the insertion axis O by 30° to 60° from the position on the distal end portion 6 in the up direction and at positions rotationally shifted to right and left in the direction about the insertion axis O by 30° to 60° from the position on the distal end portion 6 in the down direction.

The bending portion 7 can be actively and selectively bent in any of the up, down, right, and left directions and a combined direction of two of the up, down, right, and left directions in accordance with an operation input to the operation portion 3 by the operator.

Specifically, as illustrated in FIG. 4, the bending portion 7 is formed of a plurality of bending pieces 25 coupled to each other in the longitudinal axial direction N through pivot portions 25a and 25b alternately, the pivot portions 25a being disposed at positions on the insertion portion 2 in the up and down directions, the pivot portions 25b being disposed at positions on the insertion portion 2 in the right and left directions.

A signal cable 11a, the light guides 12, and the treatment instrument insertion channel 13 extending from the image pickup unit 11 are inserted inside the plurality of bending pieces 25 in substantially the same disposition as disposition in the distal end portion 6.

Wire guides (not illustrated) into which the respective pulling wires 23a to 23d are inserted are formed at predetermined bending pieces 25 at substantially the same positions in the direction about the insertion axis O as positions of the above-described wire fixation portions 21. Outer peripheries of the plurality of bending pieces 25 are covered by the bending rubber 22 extending from the distal end portion 6 side.

The flexible tube portion 8 is formed as a tubal member that is flexible and passively bendable. The signal cable 11a, the light guides 12, and the treatment instrument insertion channel 13 (all not illustrated in FIG. 5) described above are inserted inside the flexible tube portion 8.

As illustrated in FIG. 6, the bending operation mechanism 70 is provided inside the operation portion body 32.

As illustrated in FIGS. 6 to 8, the bending operation mechanism 70 has a main part including a housing 51, the operation lever 45, a wire pulling member 54, the pulling wires 23a to 23d extended in the longitudinal axial direction N in the insertion portion 2 and the operation portion 3, a cylinder 43 as a button connection member for the suction button 41, and four pulleys 68a to 68d.

As described above, the operation lever 45 is formed as a joystick-type lever tiltable in any of the up, down, right, and left directions or a combined direction of any two directions of the up, down, right, and left directions.

Specifically, as illustrated in FIG. 6, the operation lever 45 has a main part including a shaft 44, a base member 53 connected to one end of the shaft 44 in an extension direction E in the housing 51 formed in a substantially cylindrical shape, and the finger contact portion 46 connected to the other end of the shaft 44 in the extension direction E.

As illustrated in FIG. 8, the wire pulling member 54 is formed in an X plane shape with four arms 54b1, 54b2, 54b3, and 54b4, and the base member 53 of the operation lever 45 is fixed to a center 54a by a screw or the like. Note that the wire pulling member 54 may be formed in a cross plane shape.

With this configuration, the arms 54b1 to 54b4 of the wire pulling member 54 are tiltable in the tilt direction of the operation lever 45 in cooperation with tilt of the operation lever 45.

Note that detailed tilt configurations of the operation lever 45 and the wire pulling member 54 are well known, and thus description of the configurations will be omitted. The wire pulling member 54 may be formed integrally with the operation lever 45.

As illustrated in FIGS. 6 and 8, the arms 54b1 to 54b4 are disposed at positions rotationally shifted in a direction about a central axis O1 of the operation lever 45 by 30° to 60° (for example, 45°) from respective positions in the up, down, right, and left tilt directions defined for the operation lever 45. With this configuration, the wire pulling member 54 is formed in the X plane shape.

Wire fixation holes 54c1, 54c2, 54c3, and 54c4 are drilled at sides of the respective arms 54b1 to 54b4 farther from the center 54a.

As illustrated in FIG. 8, a proximal end of the pulling wire 23a in the longitudinal axial direction N is connected to the wire fixation hole 54c1. A proximal end of the pulling wire 23b in the longitudinal axial direction N is connected to the wire fixation hole 54c2. A proximal end of the pulling wire 23c in the longitudinal axial direction N is connected to the wire fixation hole 54c3. A proximal end of the pulling wire 23d in the longitudinal axial direction N is connected to the wire fixation hole 54c4.

The pulling wires 23a to 23d move in the longitudinal axial direction N and the extension direction E with tilt of the wire pulling member 54.

As illustrated in FIG. 7, two pulleys 68a and 68b pivotally supported to a rotation shaft 71 in the operation portion body 32 are engaged at halfway positions on the pulling wires 23a and 23b, respectively. Two pulleys 68c and 68d pivotally supported to a rotation shaft 72 in the operation portion body 32 are engaged at halfway positions on the pulling wires 23c and 23d, respectively.

The pulleys 68a to 68d change, from the extension direction E to the longitudinal axial direction, directions of the pulling wires 23a to 23d extended from the respective arms 54b1 to 54b4 and wound around respective outer peripheral portions 68ag, 68bg, 68cg, and 68dg (the outer peripheral portions 68cg and 68dg are not illustrated), and are rotatable about the predetermined rotation shafts 71 and 72 with rotation centers at the rotation shafts 71 and 72 along with movement of the pulling wires 23a to 23d.

In such a configuration, for example, when the operator grasps the grasping portion 31 of the operation portion 3 and tilts the operation lever 45 in the left tilt direction with the thumb of a grasping hand, mainly the two pulling wires 23b and 23d coupled to the two arms 54b2 and 54b4 positioned in the right tilt direction are pulled and loosened. The bending portion 7 is bent to the left side by the pulling of the two pulling wires 23b and 23d.

For example, when the operator grasps the grasping portion 31 of the operation portion 3 and tilts the operation lever 45 in the right tilt direction with the thumb of a grasping hand, mainly the two pulling wires 23a and 23c coupled to the two arms 54b1 and 54b3 positioned in the left tilt direction are pulled and loosened. The bending portion 7 is bent to the right side by the pulling of the two pulling wires 23a and 23c.

For example, when the operator grasps the grasping portion 31 of the operation portion 3 and tilts the operation lever 45 in the down tilt direction with the thumb of a grasping hand, mainly the pulling wires 23*c* and 23*d* coupled to the two arms 54*b*3 and 54*b*4 positioned in the up tilt direction are pulled and loosened. The bending portion 7 is bent to the lower side by the pulling of the two pulling wires 23*c* and 23*d*.

For example, when the operator grasps the grasping portion 31 of the operation portion 3 and tilts the operation lever 45 in the up tilt direction with the thumb of a grasping hand, mainly the pulling wires 23*a* and 23*b* coupled to the two arms 54*b*1 and 54*b*2 positioned in the down tilt direction are pulled and loosened. The bending portion 7 is bent to the upper side by the pulling of the two pulling wires 23*a* and 23*b*.

For example, when the operator grasps the grasping portion 31 of the operation portion 3 and tilts the operation lever 45 in a lower-left tilt direction with the thumb of a grasping hand, mainly the pulling wire 23*d* coupled to the one arm 54*b*4 positioned in an upper-right tilt direction is pulled and loosened. The bending portion 7 is bent to a lower-left side by the pulling of the pulling wire 23*d*.

For example, when the operator grasps the grasping portion 31 of the operation portion 3 and tilts the operation lever 45 in a lower-right tilt direction with the thumb of a grasping hand, mainly the pulling wire 23*c* coupled to the one arm 54*b*3 positioned in an upper-left tilt direction is pulled and loosened. The bending portion 7 is bent to a lower-right side by the pulling of the pulling wire 23*c*.

For example, when the operator grasps the grasping portion 31 of the operation portion 3 and tilts the operation lever 45 in the upper-left tilt direction with the thumb of a grasping hand, mainly the pulling wire 23*b* coupled to the one arm 54*b*2 positioned in the lower-right tilt direction is pulled and loosened. The bending portion 7 is bent to an upper-left side by the pulling of the pulling wire 23*b*.

For example, when the operator grasps the grasping portion 31 of the operation portion 3 and tilts the operation lever 45 in the upper-right tilt direction with the thumb of a grasping hand, mainly the pulling wire 23*a* coupled to the one arm 54*b*1 positioned in the lower-left tilt direction is pulled and loosened. The bending portion 7 is bent to an upper-right side by the pulling of the pulling wire 23*a*.

The suction button 41 is removably attached to the cylinder 43, and similarly to the suction button 41, and the cylinder 43 is disposed at the center of the operation portion body 32 in the right-left width direction so that the cylinder 43 overlaps the insertion axis O.

Accordingly, for example, as illustrated in FIG. 6, the cylinder 43 is disposed in a region B1 (refer to FIG. 9) to be described later between the two arms 54*b*1 and 54*b*2 of the wire pulling member 54 in an adjacent direction B of the two arms 54*b*1 and 54*b*2.

Subsequently, a detailed disposition position of the cylinder 43 and detailed disposition positions and angles of the two pulleys 68*a* and 68*b* will be described below with reference to FIGS. 9 to 12.

Figure 9:
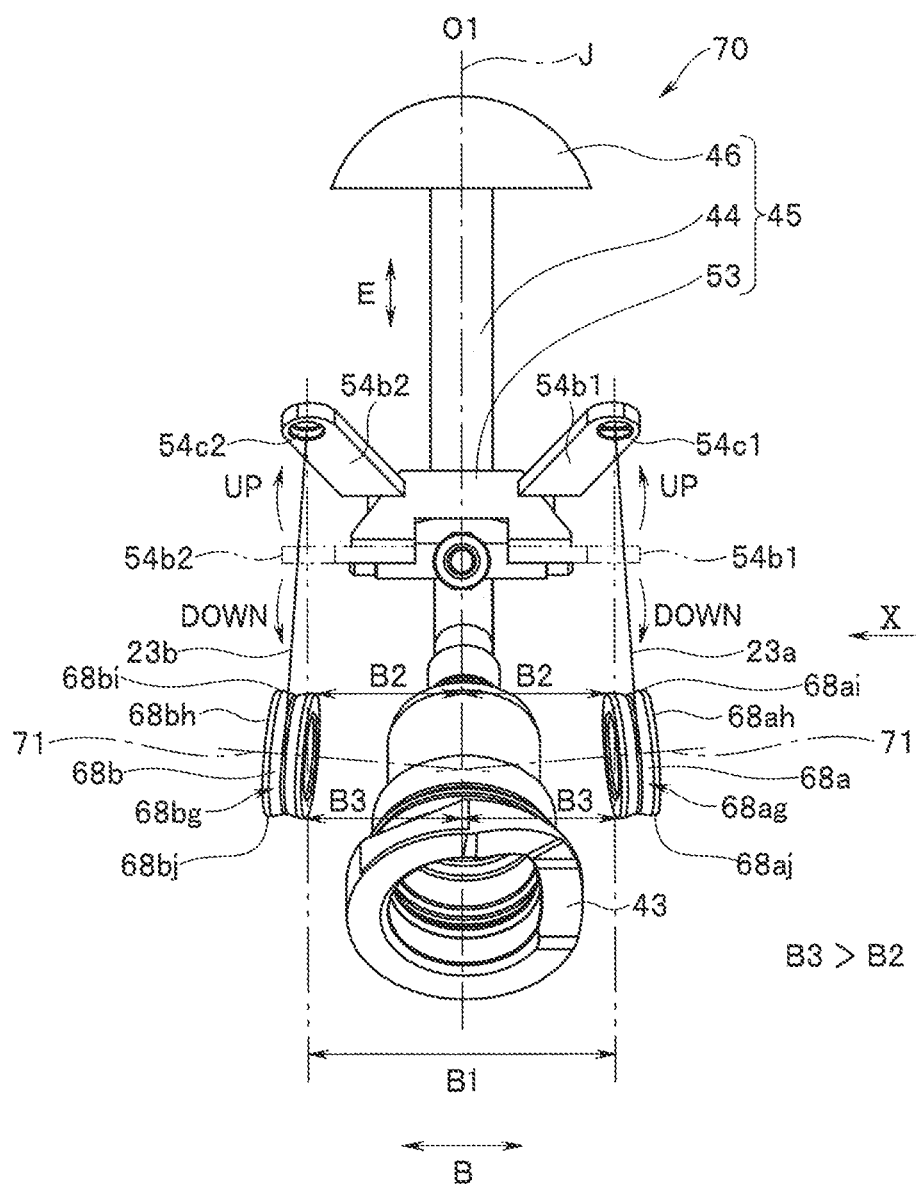
FIG. 9 is a diagram illustrating the bending operation mechanism in FIG. 7 in a state in which the operation lever is tilted in an up direction, when viewed in IX direction in FIG. 7.
Figure 10:
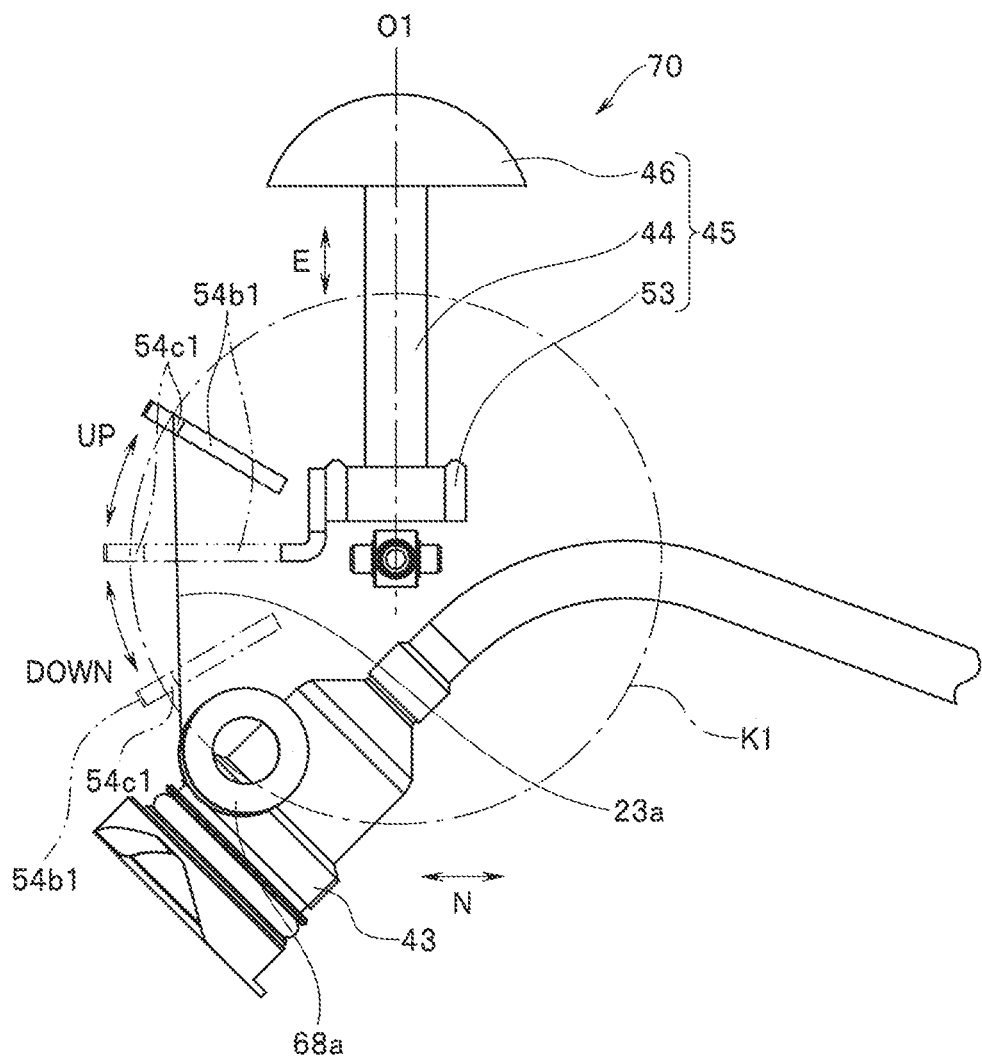
FIG. 10 is a diagram of the bending operation mechanism in FIG. 9 when viewed in X direction in FIG. 9.

FIG. 9 is a diagram illustrating the bending operation mechanism in FIG. 7 in a state in which the operation lever is tilted in the up direction, when viewed in IX direction in FIG. 7, and FIG. 10 is a diagram of the bending operation mechanism in FIG. 9 when viewed in X direction in FIG. 9.

Figure 11:
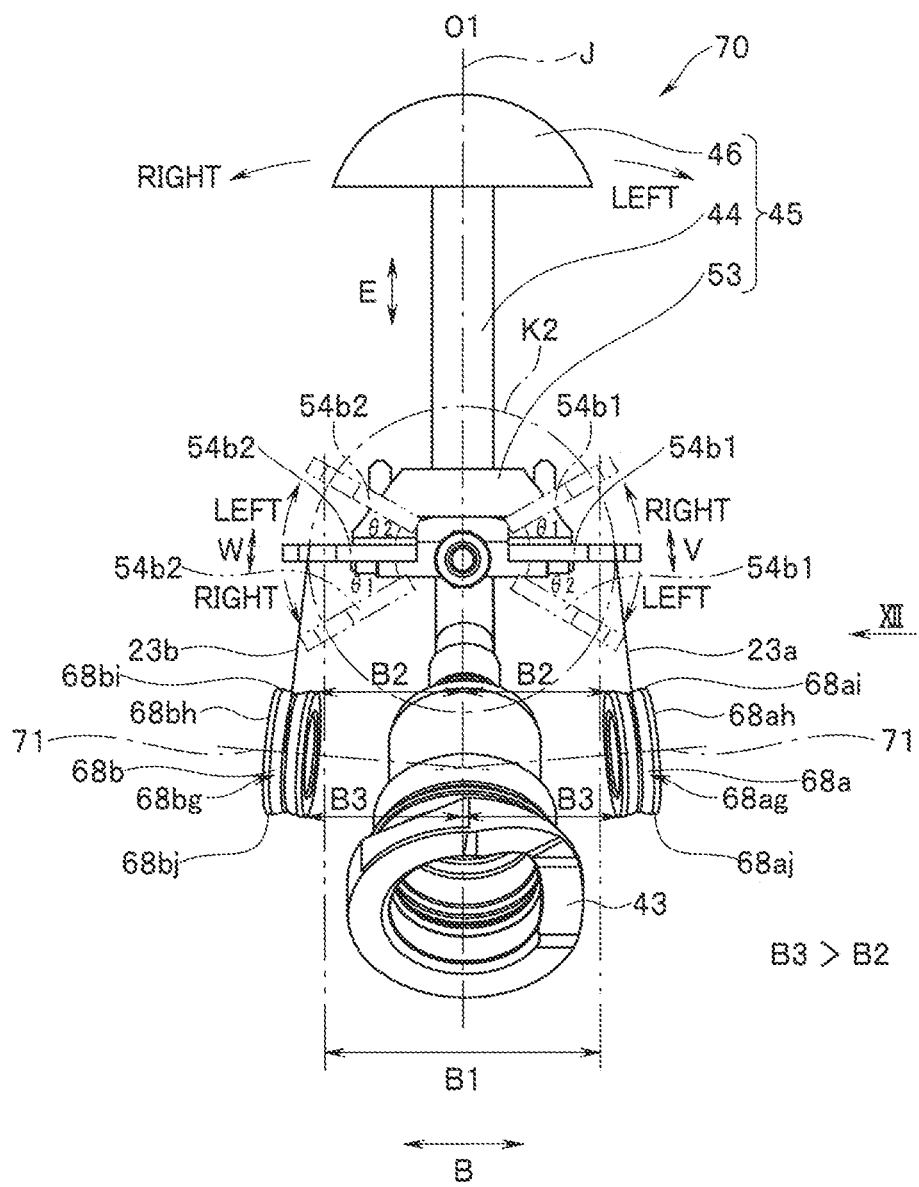
FIG. 11 is a diagram illustrating a state in which the operation lever of the bending operation mechanism in FIG. 9 is tilted in right and left directions.
Figure 12:
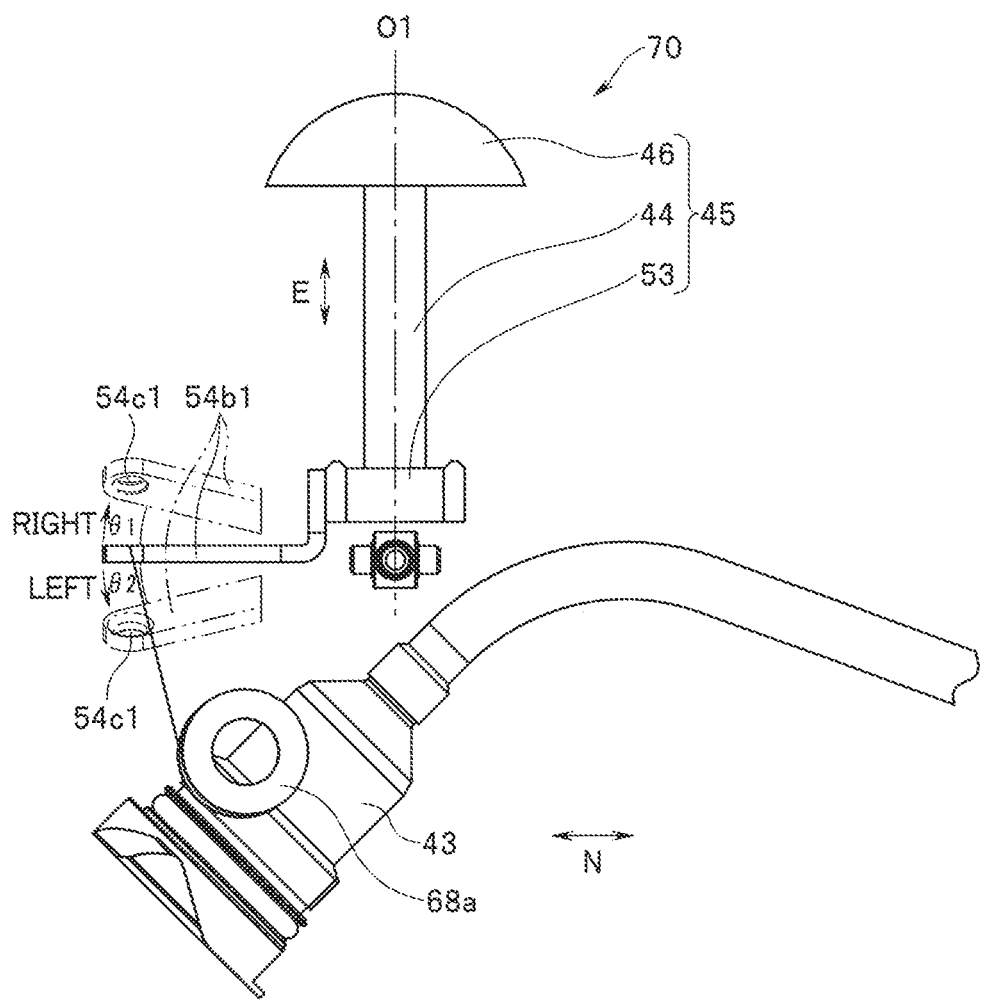
FIG. 12 is a diagram of the bending operation mechanism in FIG. 11 when viewed in XII direction in FIG. 11.

FIG. 11 is a diagram illustrating a state in which the operation lever of the bending operation mechanism in FIG. 9 is tilted in the right and left directions, and FIG. 12 is a diagram of the bending operation mechanism in FIG. 11 when viewed in XII direction in FIG. 11.

As illustrated in FIGS. 9 and 11, the pulleys 68*a* and 68*b* are disposed on both sides of the cylinder 43 in the adjacent direction B.

As illustrated in FIGS. 9 and 11, the cylinder 43 is disposed in the region B1 between the two arms 54*b*1 and 54*b*2 of the wire pulling member 54 in the adjacent direction B of the two arms 54*b*1 and 54*b*2.

As illustrated in FIGS. 9 and 11, the pulleys 68*a* and 68*b* are disposed with the predetermined rotation shaft 71 tilted so that an extended line of the predetermined rotation shaft 71 intersects with the cylinder 43.

More specifically, the pulleys 68*a* and 68*b* are disposed at positions on a rotation trajectory K1 formed by the arms 54*b*1 and 54*b*2 with a rotation center at the central axis O1 of the operation lever 45 as illustrated in FIG. 10 when the operation lever 45 is tilted closer to the cylinder 43, in other words, is tilted in the down direction, the positions being separated from the two arms 54*b*1 and 54*b*2 in a direction of the rotation trajectory K1 and the adjacent direction B.

As illustrated in FIGS. 9 and 11, each of the pulleys 68*a* and 68*b* is disposed with the corresponding one of the outer peripheral portions 68*ag* and 68*bg* tilted so that, in the adjacent direction B, a first distance B2 between one end part 68*ai* or 68*bi* of the corresponding one of the outer peripheral portions 68*ag* and 68*bg* positioned on a side closer to the arms 54*b*1 and 54*b*2 in the extension direction E and an axis center J of the cylinder 43 is shorter than a second distance B3 between the other end part 68*aj* or 68*bj* of the corresponding one of the outer peripheral portions 68*ag* and 68*bg* positioned on a side farther from the arms 54*b*1 and 54*b*2 in the extension direction E and the axis center J of the cylinder 43 (B2<B3).

Note that, as illustrated in FIGS. 11 and 12, a tilt angle of the pulley 68*a* as one of the two pulleys 68*a* and 68*b* disposed with the outer peripheral portions 68*ag* and 68*bg* being tilted aligns with a tangent line direction V of a circular rotation trajectory K2 formed by the arms 54*b*1 and 54*b*2 with a rotation center at the central axis O1 of the operation lever 45 at a maximum tilt angle θ1 of the operation lever 45 in the right direction. A tilt angle of the other pulley 68*b* aligns with a tangent line direction W of the circular rotation trajectory K2 of the operation lever 45 at a maximum tilt angle θ2 of the operation lever in the left direction.

Note that the other configuration of the bending operation mechanism 70 is same as that in conventional cases, and thus description thereof will be omitted.

As described above, in the present embodiment, the pulleys 68*a* and 68*b* are disposed on both sides of the cylinder 43 in the adjacent direction B in the bending operation mechanism 70 provided in the operation portion body 32.

As described above, the cylinder 43 is disposed in the region B1 between the two arms 54*b*1 and 54*b*2 of the wire pulling member 54 in the adjacent direction B of the two arms 54*b*1 and 54*b*2.

As described above, the pulleys 68*a* and 68*b* are disposed at positions on the rotation trajectory K1 formed by the arms 54*b*1 and 54*b*2 when the operation lever 45 is tilted closer to the cylinder 43, in other words, is tilted in the down direction, the positions being separated from the two arms 54*b*1 and 54*b*2 in the direction of the rotation trajectory K1 and the adjacent direction B.

As described above, as illustrated in FIGS. 9 and 11, each of the pulleys 68*a* and 68*b* is disposed with the corresponding one of the outer peripheral portions 68*ag* and 68*bg* being tilted so that, in the adjacent direction B, the first distance B2 between the one end part 68*ai* or 68*bi* of the corresponding one of the outer peripheral portions 68*ag* and 68*bg* and the axis center J of the cylinder 43 is shorter than the second distance B3 between the other end part 68*aj* or 68*bj* and the axis center J of the cylinder 43 (B2<B3).

With these configurations, in order to achieve size reduction of the operation portion 3, the pulleys 68*a* and 68*b* are disposed at a tilt as described above although the cylinder 43 is disposed in the region B1 between the two pulleys 68*a* and 68*b*.

Thus, it is possible to dispose the pulleys 68*a* and 68*b* without interference with tilt of the cylinder 43 and the arms 54*b*1 and 54*b*2 and reduce an interval between the pulleys 68*a* and 68*b* on both sides of the cylinder 43 in the adjacent direction B, thereby further achieving size reduction of the operation portion 3.

In the present embodiment described above, the tilt angle of the pulley 68*a* as one of the two pulleys 68*a* and 68*b* aligns with the tangent line direction V of the circular rotation trajectory K2 of the operation lever 45 at the maximum tilt angle θ1 of the operation lever 45 in the right direction, and the tilt angle of the other pulley 68*b* aligns with the tangent line direction W of the circular rotation trajectory K2 of the operation lever 45 at the maximum tilt angle θ2 of the operation lever in the left direction.

With these configurations, when the operation lever 45 is tilted to the maximum angle in the right direction or the left direction, the tilt angles of the outer peripheral portions 68*ag* and 68*bg* of the pulleys 68*a* and 68*b* align with the tangent line directions V and W of the rotation trajectory K2. Accordingly, a pulling loss of the outer peripheral portions 68*ag* and 68*bg* when passing through the pulleys 68*a* and 68*b* for the pulling wires 23*a* and 23*b* is small.

Note that the above-described loss of the wires 23*a* and 23*b* along with tilt of the operation lever 45 in the up and down directions cannot be reduced by tilting the pulleys 68*a* and 68*b*. However, the above-described wire pulling loss can be minimized by, in addition to the above-described condition, disposing the pulleys 68*a* and 68*b* with the outer peripheral portions 68*ag* and 68*bg* at appropriate positions in the longitudinal axial direction N, specifically, positions directly below the wire fixation holes 54*c*1 and 54*c*2 at a maximum tilt position of the operation lever 45 in the up and down directions as illustrated in FIGS. 9 and 11.

With the above-described configuration, since the pulling loss of the pulling wires 23*a* and 23*b* is small, it is possible to avoid a heavy tilt operation of the operation lever 45 due to a large amount of pulling force for pulling the pulling wires 23*a* and 23*b* and avoid small pulling amounts of the pulling wires 23*a* and 23*b* when the operation lever 45 is tilted by an angle same as that in conventional cases.

Note that, as illustrated in FIG. 8, when the wire pulling member 54 has an X plane shape, a length (rotation radius) α from the central axis O1 to the arms 54*b*1 and 54*b*2 in the up and down tilt directions is longer than a length (rotation radius) β in the right and left tilt directions (α>β), and accordingly, the rotation trajectory K1 in the up and down directions with a rotation center at the central axis O1 of the operation lever 45 is longer than the rotation trajectory K2 in the right and left directions as illustrated in FIGS. 9 and 11. In other words, the operation lever 45 has a smaller tilt amount in the right and left directions than in the up and down directions.

Thus, it is understood that a tilt operation of the operation lever 45 in the right and left directions has larger influence on the above-described wire pulling loss due to the tilt operation than a tilt operation in the up and down directions.

In other words, it is understood that, when a wire pulling loss is generated by a tilt operation of the operation lever 45 in the up and down directions due to tilt of the pulleys 68*a* and 68*b*, the influence of the tilt operation is smaller than the influence of the tilt operation in the right and left directions because of α>β.

With the above-described configurations, it is possible to provide the bending operation mechanism 70 for the endoscope, which has a configuration that achieves size reduction of the operation portion 3 of the endoscope 1 without loss generation in the amount of pulling force on the pulling wires 23*a* and 23*b* along with tilt of the operation lever 45 in the configuration in which the cylinder 43 is disposed in the region between the two pulleys 68*a* and 68*b*.

A modification will be described below. As illustrated in FIGS. 11 and 12, when the operation lever 45 is tilted in the right and left directions, tension that would cause deviation from the outer peripheral portions 68*ag* and 68*bg* of the pulleys 68*a* and 68*b* to a side farther from the cylinder 43 in the adjacent direction B is applied to the pulling wires 23*a* and 23*b*.

This is because the pulling wires 23*a* and 23*b* are likely to violently move at the outer peripheral portions 68*ag* and 68*bg* along with pulling and loosening since the operation lever 45 has a larger tilt amount, in other words, a larger pulling amount in the up and down directions than in the right and left directions as described above.

Thus, in order to prevent removal of the pulling wires 23*a* and 23*b* from the outer peripheral portions 68*ag* and 68*bg*, removal prevention flanges for the pulling wires 23*a* and 23*b* may be provided at outer peripheral edge portions 68*ah* and 68*bh* of the outer peripheral portions 68*ag* and 68*bg* on the side farther from the cylinder 43.

Although the above description of the present embodiment is made with the example in which the number of arms of the wire pulling member 54 is four, the number of pulling wires is four, and the number of pulleys is four, the present embodiment is not limited to the configuration described above but is applicable to a configuration in which the numbers are at least two.

Although the above description is made with the example in which the connection portion for a push button is the cylinder 43 connected to the suction button 41, it goes without saying that the present embodiment is not limited to the configuration described above but is also applicable to a connection portion for any other electric button or any other push button such as a button of an engagement mechanism or an angle lock button of the bending portion 7.

Although the above description is made with the example in which the endoscope 1 is an endoscope for bronchi, it goes without saying that the present embodiment is not limited to the configuration described above but is also applicable to any other endoscope.

What is claimed is:

1. A bending operation mechanism for use with an endoscope, the bending operation mechanism comprising:
    an operation lever;
    a wire pulling member connected to the operation lever and including first and second arms tiltable along with tilt of the operation lever about a fixed axis;
    first and second pulling wires extending from the first and second arms, respectively, and configured to move with tilt of the wire pulling member;
    a tubular member having an opening configured for insertion of a button, the tubular member being disposed in a region between the first and second arms in a direction extending between the first and second arms; and first and second pulleys corresponding to the first and second arms, respectively, the first and second pulleys receiving the first and second pulling wires, respectively, wherein a rotation shaft of each of the first and second pulleys is inclined relative to a plane orthogonal to the fixed axis such that a first side of each of the first and second pulleys that is closer to the first and second arms, respectively, is closer to the fixed axis than a second side of each of the first and second pulleys that is further from the first and second arms, respectively; and the first side and the second side are on a same surface of each of the first and second pulleys.

2. The bending operation mechanism according to claim 1, wherein the tubular member is disposed between the first and second pulleys in the direction and the the first and second pulleys are disposed at positions separated from a rotation trajectory formed by the the first and second arms when the operation lever is tilted closer to the tubular member.

3. The bending operation mechanism according to claim 2, wherein the operation lever is tiltable in any of a first direction, a second direction, a third direction, a fourth direction, and a combined direction of two of the first direction, the second direction, the third direction and the fourth direction, wherein the bending operation mechanism further comprises third and fourth arms, third and fourth pulling wires and third and fourth pulleys, the tubular member is disposed between the third and fourth arms in the direction, and the third and fourth pulling wires from the third and fourth arms, respectively, are wound about third and fourth pulleys, respectively.

4. The bending operation mechanism according to claim 3, wherein when the second direction corresponds to the operation lever being tilted closer to the tubular member, the first direction is opposite to the second direction, and the third direction and the fourth direction are orthogonal to the first direction and the second direction, respectively, a first tilt angle of one of the third and fourth pulleys corresponding to a respective one of the third and fourth arms aligns with a tangent line direction of a circular rotation trajectory of the operation lever at a maximum tilt angle of the operation lever in the third direction, and a second tilt angle of another of the third and fourth pulleys corresponding to another of the third and fourth arms aligns with a tangent line direction of the circular rotation trajectory of the operation lever at a maximum tilt angle of the operation lever in the fourth direction.

5. The bending operation mechanism according to claim 1, wherein the button is a suction button.

6. The bending operation mechanism according to claim 1, wherein the tubular member is a cylinder.

7. The bending operation mechanism according to claim 1, wherein the tubular member is a connection portion for an electric button.

8. The bending operation mechanism according to claim 1, wherein the tubular member is a connection portion for a button of an engagement mechanism.

9. The bending operation mechanism according to claim 1, wherein the tubular member is a connection portion for an angle lock button of a bending portion.

10. An endoscope comprising:
an operation portion; and
a bending operation mechanism comprising:
an operation lever rotatably disposed relative to the operation portion;
a wire pulling member connected to the operation lever and including first and second arms tiltable along with tilt of the operation lever about a fixed axis;
first and second pulling wires extending from the first and second arms, respectively, and configured to move with tilt of the wire pulling member;
a tubular member having an opening configured for insertion of a button, the opening being on an external surface of the operation portion, the tubular member being disposed in a region between the first and second arms in a direction extending between the first and second arms; and
first and second pulleys corresponding to the first and second arms, respectively, the first and second pulleys receiving the first and second pulling wires, respectively,
wherein a rotation shaft of each of the first and second pulleys is inclined relative to a plane orthogonal to the fixed axis such that a first side of each of the first and second pulleys that is closer the first and second arms, respectively, is closer to the fixed axis than a second side of each of the first and second pulleys that is further from the first and second arms, respectively; and
the first side and the second side are on a same surface of each of the first and second pulleys.

11. The endoscope according to claim 10, wherein the button is a suction button.

12. The endoscope according to claim 10, wherein the tubular member is a cylinder.

13. The endoscope according to claim 10, wherein the tubular member is a connection portion for an electric button.

14. The endoscope according to claim 10, wherein the tubular member is a connection portion for a button of an engagement mechanism.

15. The endoscope according to claim 10, wherein the tubular member is a connection portion for an angle lock button of a bending portion.

16. The bending operation mechanism according to claim 1, wherein a first outside dimension of the tubular member adjacent the first sides of the first and second pulleys is smaller than a second outside dimension of the tubular member adjacent the second sides of the first and second pulleys.

17. A bending operation mechanism for use with an endoscope, the bending operation mechanism comprising:
an operation lever;
a wire pulling member connected to the operation lever and including first and second arms tiltable along with tilt of the operation lever;
first and second pulling wires extending from the first and second arms, respectively, and configured to move with tilt of the wire pulling member;
a tubular member having an opening configured for insertion of a button, the tubular member being disposed in a region between the first and second arms in a direction extending between the first and second arms; and first and second pulleys corresponding to the first and second arms, respectively, the first and second pulleys receiving the first and second pulling wires, respectively, wherein a first rotation axis of the first and second pulleys are each inclined relative to a line orthogonal to a center axis of the tubular member such that a first intersection of each first rotation axis with the center axis is further from a pivot axis of the operation lever than a second intersection of a virtual second rotation axis of each of the first and second pulleys if not inclined.

18. The bending operation mechanism according to claim 17, wherein the first and second pulleys are disposed at positions separated from a rotation trajectory formed by the adjacent arms when the operation lever is tilted closer to the tubular member.

19. The bending operation mechanism according to claim 18, wherein the operation lever is tiltable in any of a first direction, a second direction, a third direction, a fourth direction, and a combined direction of two of the first direction, the second direction, the third direction and the fourth direction, wherein the bending operation mechanism further comprises third and fourth arms, third and fourth pulling wires and third and fourth pulleys, the tubular member is disposed between the third and fourth arms in the direction, and the third and fourth pulling wires from the third and fourth arms, respectively, are wound about the third and fourth pulleys, respectively.

20. The bending operation mechanism according to claim 19, wherein when the second direction corresponds to the operation lever being tilted closer to the tubular member, the first direction is opposite to the second direction, and the third direction and the fourth direction are orthogonal to the first direction and the second direction, respectively, one of the third and fourth pulleys corresponding to a respective one of the third and fourth arms is tilted and tilts at a first angle that aligns with a tangent line direction of a circular rotation trajectory of the operation lever at a maximum tilt angle of the operation lever in the third direction, and another of the third and fourth pulleys corresponding to another of the third and fourth arms is tilted and tilts at a second angle that aligns with a tangent line direction of the circular rotation trajectory of the operation lever at a maximum tilt angle of the operation lever in the fourth direction.

* * * * *